(12) United States Patent
Jitkoff et al.

(10) Patent No.: US 9,063,645 B1
(45) Date of Patent: Jun. 23, 2015

(54) EXPANDABLE AND COLLAPSIBLE INFORMATION PANELS

(75) Inventors: Nicholas Jitkoff, Palo Alto, CA (US); Jonah Jones, Darlinghurst (AU); Kee Kim Jonathan Heng, Zurich (CH); Bernhard Seefeld, New York, NY (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 12/774,520

(22) Filed: May 5, 2010

Related U.S. Application Data

(60) Provisional application No. 61/251,289, filed on Oct. 13, 2009, provisional application No. 61/251,292, filed on Oct. 13, 2009.

(51) Int. Cl.
*G06F 3/048* (2013.01)
*G06F 3/0485* (2013.01)
*G06F 17/30* (2006.01)
*G06F 9/44* (2006.01)
(Continued)

(52) U.S. Cl.
CPC ...... *G06F 3/04855* (2013.01); *G06F 17/30994* (2013.01); *G06F 9/4443* (2013.01); *G06F 3/0485* (2013.01); *G06F 3/0481* (2013.01); *G06F 3/0482* (2013.01)

(58) Field of Classification Search
CPC ... G06F 3/0481; G06F 3/0482; G06F 3/0483; G06F 3/04847; G06F 3/0485; G06F 3/04855; G06F 9/4443; G06F 17/2247; G06F 17/30011; G06F 17/30067; G06F 17/30235; G06F 17/30327; G06F 17/30961; G06F 17/30994; G06F 17/30595; G09G 5/14; G09G 5/34; H04L 41/22

USPC .......... 715/781, 784, 786, 787, 853, 854; 707/797, 828
See application file for complete search history.

(56) References Cited

U.S. PATENT DOCUMENTS

| | | | |
|---|---|---|---|
| 5,821,931 A | 10/1998 | Berquist et al. | |
| 6,380,957 B1 * | 4/2002 | Banning | ......... 715/828 |

(Continued)

FOREIGN PATENT DOCUMENTS

| | | |
|---|---|---|
| EP | 1526463 A1 | 4/2005 |
| EP | 2428919 A1 | 3/2012 |

(Continued)

OTHER PUBLICATIONS

Non-Final Office Action Response for U.S. Appl. No. 12/904,151, filed Feb. 5, 2013, 14 pages.

(Continued)

*Primary Examiner* — Boris Pesin
*Assistant Examiner* — Rinna Yi
(74) *Attorney, Agent, or Firm* — Brake Hughes Bellermann LLP

(57) ABSTRACT

Methods and apparatus for displaying information content in a user interface. The content includes an information panel that contains at least one information element. Information indicating a position within the user interface is used to automatically determine whether to display the information panel in its expanded or collapsed state. The title of the information panel is displayed. The title of the information element is displayed beneath the information panel title when the information panel is displayed in its expanded state. The title of the information element is not displayed when the information panel is displayed in its collapsed state.

16 Claims, 5 Drawing Sheets

(51) Int. Cl.
*G06F 3/0481* (2013.01)
*G06F 3/0482* (2013.01)

(56) References Cited

U.S. PATENT DOCUMENTS

| | | | |
|---|---|---|---|
| 7,275,063 B2 * | 9/2007 | Horn | 1/1 |
| 2003/0088623 A1 | 5/2003 | Kusuda | |
| 2003/0160815 A1 * | 8/2003 | Muschetto | 345/733 |
| 2004/0006743 A1 | 1/2004 | Oikawa et al. | |
| 2005/0004990 A1 * | 1/2005 | Durazo et al. | 709/206 |
| 2006/0059441 A1 * | 3/2006 | Todd | 715/853 |
| 2006/0161859 A1 | 7/2006 | Holecek et al. | |
| 2006/0200751 A1 | 9/2006 | Underwood et al. | |
| 2008/0065982 A1 | 3/2008 | Evanchik et al. | |
| 2008/0134093 A1 | 6/2008 | Dharmarajan et al. | |
| 2008/0184157 A1 * | 7/2008 | Selig | 715/781 |
| 2010/0269062 A1 * | 10/2010 | Kobylinski | 715/781 |
| 2011/0010641 A1 * | 1/2011 | Wolff et al. | 715/753 |
| 2011/0022955 A1 | 1/2011 | Gilfix | |
| 2013/0268837 A1 | 10/2013 | Braithwaite et al. | |

FOREIGN PATENT DOCUMENTS

| | | |
|---|---|---|
| WO | 00/56055 A2 | 9/2000 |
| WO | 2013/154904 A1 | 10/2013 |

OTHER PUBLICATIONS

Final Office Action for U.S. Appl. No. 12/904,151, mailed Mar. 20, 2013, 11 pages.

Non-Final Office Action for U.S. Appl. No. 12/904,151, mailed Nov. 5, 2012, 14 pages.

"Helpful Tip: Drag & Drop Text/URL's in Firefox", CyberNet News, Apr. 5, 2008, http://cybernetnews.com/helpful-tip-drag-drop-texturls-in-firefox/, 7 pages.

* cited by examiner

EXPANDABLE AND COLLAPSIBLE INFORMATION PANELS

CROSS REFERENCE TO RELATED APPLICATIONS

This application claims the benefit of U.S. Provisional Application No. 61/251,289, filed Oct. 13, 2009, and titled "A Browser Based Cloud Optimized Computer Platform," and U.S. Provisional Application No. 61/251,292, filed Oct. 13, 2009, and titled "Account and Boot Management in a Cloud Computing Platform," both of which are herein incorporated by reference in their entirety.

TECHNICAL FIELD

This document relates to methods and apparatus for displaying and manipulating information in a web browser.

BACKGROUND

With the creation of the world-wide-web and high speed computer networks, the paradigm for personal computer usage has dramatically shifted. In the past, users would primarily use their personal computers to run programs, and store and manipulate data that was located on their local hard-drive. Only rarely would users store or manipulate data located on a networked drive, or run a program that was provided as a network service, and even then, the programs and data were usually restricted to a local area network. Today, more and more users are storing more and more data on remote data servers, and using remotely provided web-based applications (e.g., SaaS or Software as a Service programs) to manipulate and organize that data. For example, many users today store their personal email and contact information, and even pictures, videos, and music archives on remote servers, and access that data using third party applications that are provided through and controlled by a web-browser.

Cloud computing is a style of computing in which computing resources such as application programs and file storage are remotely provided over the Internet, typically through a web browser. Many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program.

Due to this shift in computer usage, today's computer users are unlikely to want or need many of the bells and whistles provided by modern operating systems. They do not need to worry about file structures or organizing or backing up their data, because much of their data is stored, organized and backed up for them on the cloud. They do not need to worry about loading and updating software, because most of the software they use is provided to them when needed as a cloud-based service. Instead, today's computer users are more interested in quickly logging onto their computer, launching a web browser, and accessing data and programs of interest to them, which are accessible through the world wide web.

SUMMARY

This document describes systems and techniques to manage and display information in a user interface.

In one aspect, computer implemented methods and apparatus for displaying information content in a user interface is disclosed. The content to be displayed in the user interface, which includes an information panel that contains at least one information element, is received. The title of the information panel is displayed in the user interface. Information indicating a position within the user interface is also received. This information is used to determine if the at least one information element within the information panel is displayable within the user interface. If the at least one information element is displayable within the user interface, the title of the at least one information element is displayed in the user interface at a second display position that is beneath a first display position of the information panel.

In another aspect, computer implemented methods and apparatus for automatically expanding an information panel in a user interface is disclosed. The information panel can be displayed in its collapsed state within the user interface. When displayed in its collapsed state, at least one information element that is contained within the information panel is not displayed in the user interface. Information indicating a position within the user interface is received. This information is used to determine whether the at least one information element is displayable within the user interface. If the at least one information element is displayable within the user interface, the information panel is automatically displayed in its expanded state within the user interface. When the information panel is displayed in its expanded state, the at least one information element is displayed in a second display position that is beneath a first display position of the information panel within the user interface.

In another aspect, computer implemented methods and apparatus for automatically collapsing an information panel in a user interface is disclosed. The information panel can be displayed in its expanded state at a first position within the user interface. When the information panel is displayed in its expanded state, at least one information element that is contained within the information panel is displayed in the user interface at a second position that is beneath the first position. Information indicating a position within the user interface is received. The information is used to determine whether the at least one information element is no longer displayable within the user interface. If the at least one information element is no longer displayable within the user interface, the information panel is automatically displayed in its collapsed state in the user interface. When the information panel is displayed in its collapsed state, the at least one information element contained within the information panel is not displayed in the user interface.

Features and advantages of the disclosed methods and apparatus comprise one or more of the following. The user interface can be a web browser user interface or a computer desktop user interface. When the user interface is a web browser interface, the content to be displayed is the content of a web-based application. The position within the user interface can be determined by a position of a pointing device within the user interface. The position within the user interface can also be determined by a position of a scroll bar within the user interface.

DESCRIPTION OF DRAWINGS

Like reference symbols in the various drawings indicate like elements.

DETAILED DESCRIPTION

In many web based applications, for example, in a web-based e-mail application, the left hand side of the display can contain a number of Graphical User Interface ("GUI") objects, hereafter referred to as information panels, which organize information such as emails or contact lists that are displayed to a user. For example, in a web-based email application, "Inbox," "Draft," "Sent," or "Spam" information panels can be provided to organize a user's emails. To facilitate navigation of the information contained within these information panels, the panels can be made expandable and collapsible. For example, when a user is looking for a particular email he or she has sent, the "Sent" folder can be expanded and the remaining folders collapsed (e.g., by clicking on the panels). These information panels, however, can also be automatically expanded or collapsed based on the user's actions within the web browser or user interface.

Figure 1A:
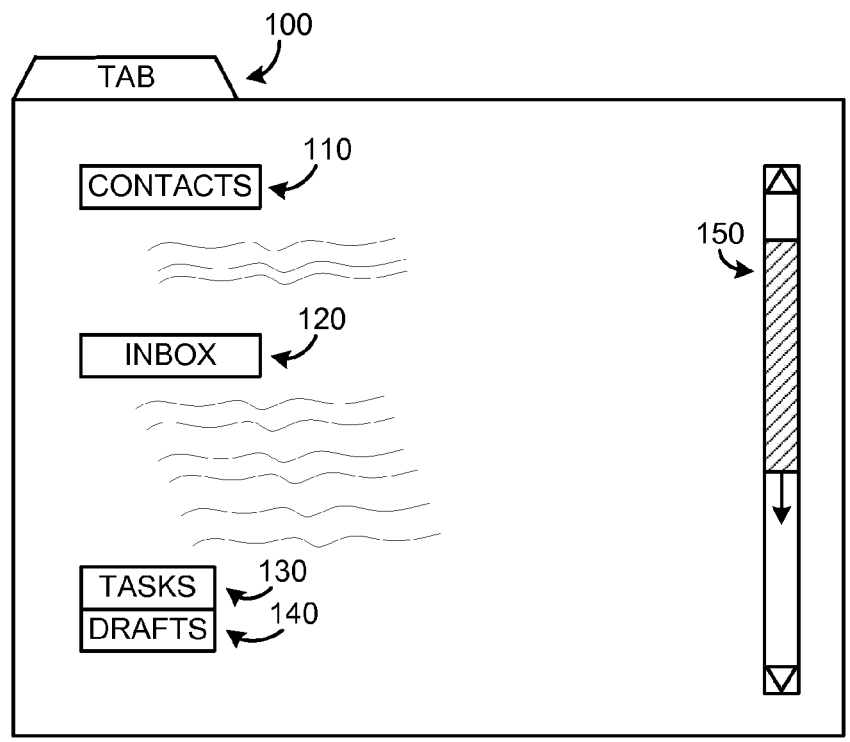
FIGS. 1A and 1B are a schematic illustration of a web-browser that provides a user with automatically collapsible and expandable information panels in a web based application.
Figure 1B:
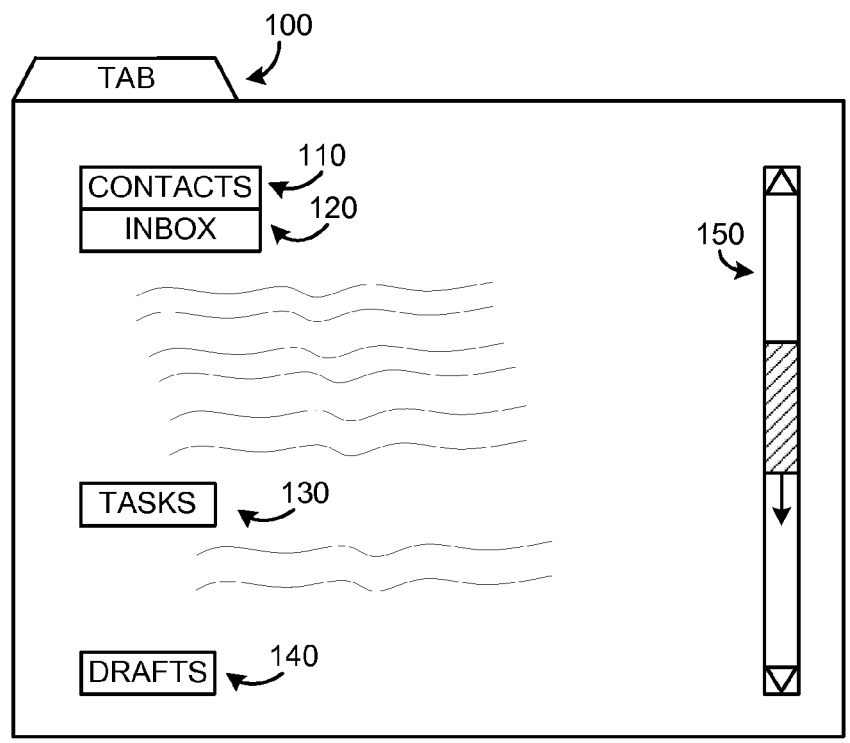

FIGS. 1A and 1B are a schematic illustration of a web-browser that provides a user with automatically collapsible and expandable information panels in a web based application. As shown in FIG. 1A, a web-based email application can provide a number of expandable and collapsible information panels 110-140 as well as a scroll bar 150 in a tabbed browser window 100. Under each information panel, one or more items of information can be stored. For example, under the "Contacts" panel 110, a plurality of contact documents such as vCards (i.e., electronic business cards) can be stored, while under the "Inbox" panel 120, a plurality of email messages that have been sent to the user can be stored. To facilitate the user's visibility into and access to the information that is stored in the application, one or more of the information panels can be expanded by default. For example, all of the information panels whose contents are fully or partially displayable within the window 100 can be expanded by default. When an information panel is expanded or displayed in its expanded state, one or more information elements that are within the information panel are displayed beneath the information panel. Thus, as shown in FIG. 1A, information panels 110 and 120 can be expanded since at least one item under each panel is displayable within the window 100, while information panels 130 and 140 can be collapsed since none of the items under either panel are currently displayable within the window 100. When an information panel is collapsed or displayed in its collapsed state, none of the information elements that are within the information panel are displayed beneath the information panel.

In one implementation, in order to view the information contained within a collapsed information panel, such as the "Tasks" panel 130, the user can manually collapse one or more of the currently expanded information panels 110 and 120, and manually expand the "Tasks" information panel 130. The user can do this, for example, by clicking on the "Tasks" information panel 130 to manually toggle its display state from a collapsed to an expanded state, and by clicking on the "Inbox" information panel 120 to manually toggle its display state from an expanded to a collapsed state. Alternatively, as disclosed herein, when a user manually expands an information panel, the operating system and/or browser can automatically collapse other information panels that are displayed in their expanded state. For example, when the user clicks on the "Tasks" information panel 130 to manually expand it, the operating system and/or browser can automatically collapse the "Contacts" and "Inbox" information panels 110 and 120 to maximize the screen area in the window 100 that can be used to display the information elements under the "Tasks" information panel 130. Moreover, as the user scrolls down the window 100, the operating system and/or browser can receive information about the user's movement within the user interface and/or browser window 100 and can use that information to automatically expand and collapse one or more of the information panels 110-140.

As shown in FIG. 1B, as a user scrolls through the items in an expanded "Contacts" information panel 110, the operating system and or web browser can move the items under the "Contacts" information panel 110 upward, and can eventually move them off-screen. When the user has scrolled through all of the items under the "Contacts" information panel 110, the operating system and/or browser can automatically collapse the information panel but continue to display its title. When the operating system and/or browser automatically collapses the "Contacts" information panel 110 as described above, it can display the "Inbox" information panel 120 directly beneath the "Contacts" information panel 110. As the user scrolls through the information elements under the expanded "Inbox" information panel 120, the operating system and/or browser can similarly move the information elements in the "Inbox" information panel 120 upward and eventually off-screen. As with the information elements under the "Contacts" information panel 110, when the user has scrolled through all of the information elements under the "Inbox" information panel 120, the operating system and/or browser can automatically collapse the "Inbox" information panel 120 but continue to display its title.

In addition to automatically collapsing information panels based on the user's actions within the user interface, the operating system and/or browser can automatically expand information panels. For example, as the user scrolls down through the "Contact" 110 and "Inbox" 120 information panels, the operating system and/or browser can use information regarding the position of the scroll bar within the window 100 to determine whether any information elements under the "Tasks" information panel 130 have become displayable. When at least one such information element becomes displayable, the operating system and/or browser can automatically expand the "Tasks" information panel 130 to display that information element beneath the title of the "Tasks" information panel. In one implementation, when determining which information elements under an information panel are currently displayable within the window 100, the operating system and/or browser can reserve screen space to display the titles of the other information panels. For example, when determining which information elements under the "Tasks" information panel 130 are currently displayable, the operating system and/or browser can reserve screen space to display at least the titles of the "Contacts" 110, "Inbox" 120, and "Drafts" 140 information panels.

The operating system and/or browser can also automatically expand the "Tasks" information panel 130 whenever the user has scrolled past the title of that information panel. For example, when the operating system and/or browser determines that the user has scrolled past the title of the "Tasks" information panel 130, the operating system and/or browser can automatically expand the "Tasks" information panel 130 to reveal one or more information elements under the information panel. In one implementation, the operating system and/or browser can automatically expand the "Tasks" information panel 130 to reveal as many information elements under the "Tasks" information panel 130 as possible, beginning with the first information element.

The process described above, i.e., of automatically expanding and contracting an application's information panels to facilitate a user's view of information stored in an application, is not limited to application based information panels such as the web-based email application's information panels described above. Instead, the process can be used to automatically expand and contract other types of information panels that can be displayed within any user interface such as a desktop display. In the context of a desktop user interface (as opposed to an application user interface as described above), an information panel is a GUI element that can be docked to an edge of the desktop display. Desktop user interface information panels can contain applications, notifications, browser histories, document lists, music play lists, chat histories and user generated content such as pop-up windows. For example, the Talk application available from Google, Inc., can be docked as an information panel in a desktop user interface on a computer display. When expanded, the "Talk" information panel can reveal a list of chats the user has had with other users using the Google "Talk" application, as well as metadata about the chats (e.g., with whom they were conducted), and the content of the chats themselves. Similarly, the "Docs" application available from Google, Inc., can be docked as an information panel to the side of a desktop user interface on a computer display. When expanded, the "Docs" information panel can reveal a list of documents the user has created, reviewed or edited using the Google "Docs" application or any other document creation and viewing application. The documents in the list can be stored locally on the user's computer, or remotely on a network or cloud-based server.

In general, the operating system and/or browser can automatically expand and collapse desktop user interface information panels based on a user's activity within or movement through the desktop user interface. For example, as explained above, the operating system and/or browser can determine whether to automatically expand or collapse an information panel based on the position and movement of a scroll bar within the user interface or based on the position and movement of a cursor representing a pointing device (e.g., a mouse) within the user interface. The operating system and/or browser can receive information about the current position of a scroll bar or cursor within the user interface, and can automatically expand one or more information panels to reveal the information elements that are contained within those information panels as described above. For example, if a user selects (e.g., clicks on) an information panel with a pointing device, the operating system and/or browser can expand that information panel to reveal its information elements to the user. In doing so, the operating system and/or browser can automatically collapse other information panels to reveal more content from the information panel selected by the user. Similarly, as a user scrolls through the desktop user interface, the operating system and/or browser can determine from the position of the scroll bar when at least one information element within an information panel becomes displayable, and can automatically expand the information panel when such a determination is made.

The operating system and/or browser can also automatically collapse one or more information panels based on the position and movement of a scroll bar or cursor representing a pointing device within the user interface. For example, the operating system and/or browser can automatically collapse all information panels except for an information panel the user selects (e.g., clicks on) with a pointing device. The operating system and/or browser can also determine, based on the position of a scroll bar within the user interface, when none of the information elements within an information panel are currently displayable within the user interface, and can automatically collapse the information panel when such a determination is made. Similarly, as described above, the operating system and/or browser can automatically collapse an information panel when a user has scrolled through all of the information elements that are contained within that information panel.

Figure 2A:
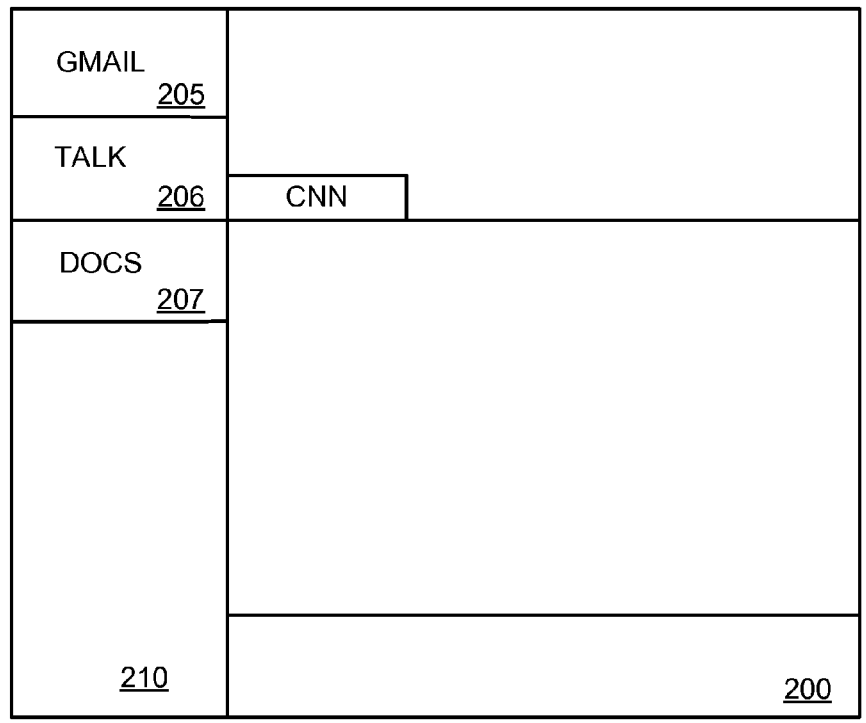
FIGS. 2A and 2B are a schematic illustration of a computer user interface that contains a plurality of expandable and collapsible information panels vertically stacked in a panel bar.
Figure 2B:
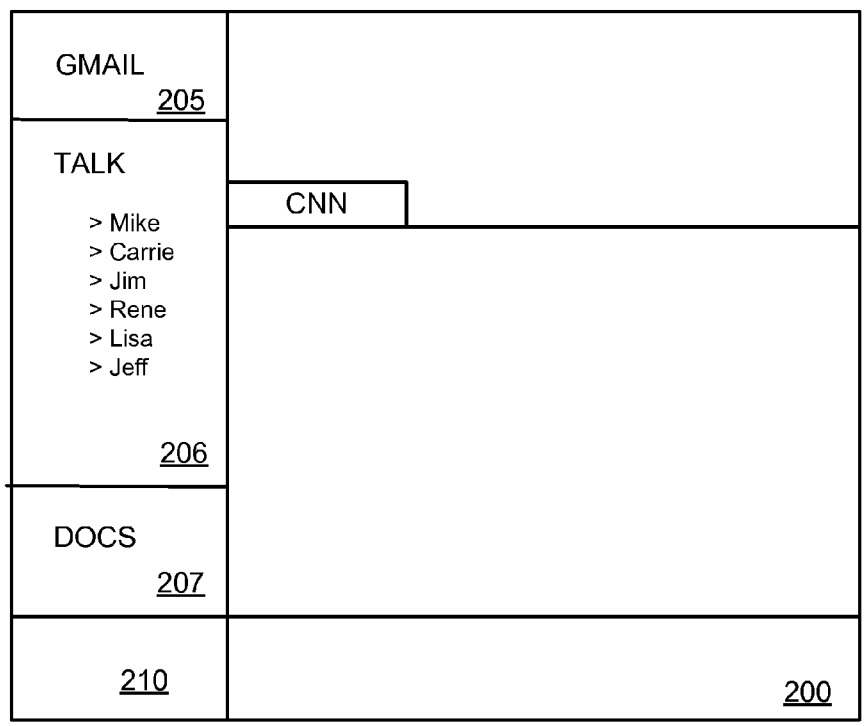

FIGS. 2A and 2B are a schematic illustration of a desktop user interface that contains a plurality of expandable and collapsible information panels vertically stacked in a panel bar. In the Chrome OS operating system, available from Google, Inc., each tab in a tabbed web browser can be treated as a separate windowing element and can have all the attributes, priorities and privileges of the web browser itself. Consequently, tabs in the web browser can be separated from the browser and docked to an edge of the desktop user interface as an information panel in a panel bar. The information panels can be vertically stacked along a side of the screen in a vertical panel bar, or horizontally displayed at the top or bottom of the screen in a horizontal panel bar.

As shown in FIG. 2A, the Google Gmail 205, Google Talk 206 and Google Docs 207 applications can be vertically stacked as a series of information panels in a vertical Panel Bar 210 of a desktop user interface 200. Vertical Panel Bar 210 can be displayed at the left edge of user interface 200 as shown in the figures, or along the right edge of user interface 200 (not shown). As with the information panels in an application user interface, the information panels in a desktop user interface can be automatically expanded and collapsed by an operating system based on a user's activity within the user interface. The automatic expansion and collapse of information panels within a desktop user interface can occur in the same manner as the automatic expansion and collapse of information panels within an application user interface (e.g., the "Inbox", "Contacts", "Tasks" and "Drafts" information panels in the web-based email application) as described above. As the user scrolls through the user interface, the operating system can use information about the current position and movement of a scroll bar or cursor representing a pointing device to automatically expand an information panel in the Panel Bar 210. For example, the operating system can expand an information panel when a user selects it (e.g., clicks on it), and can automatically collapse other information panels within the desktop user interface in order to provide the user with a deeper view into the selected information panel. Moreover, the operating system can expand an information panel when the user scrolls past the title of the information panel, or when the operating system and/or browser determines that at least one information element within the information panel becomes displayable within the user interface. Similarly, the operating system can automatically collapse an information panel in the Panel Bar 210 when the user has scrolled past the last information element in the information panel, or when the operating system and/or browser determines that none of the information elements within the information panel are currently displayable.

As shown in FIG. 2B, when the operating system automatically expands an information panel, such as the "Talk" information panel 206, the individual information elements that are contained within that information panel are revealed. For example, when a user scrolls past the "Talk" information panel 206, the operating system can automatically expand the "Talk" information panel 206 to reveal a number of recent chats the user has had with other users. The information revealed can include, for example, the person with whom the user chatted and the date and time (not shown) of the chat. Other information could also be revealed, of course, such as the duration of the chat and the content of the chat itself. Of course, when different information panels are expanded, different information elements can be revealed. For example, if the operating system and/or browser automatically expanded the "Docs" information panel 207, the expanded information panel could reveal a list of documents the user has recently opened, saved, created, edited, copied, renamed or viewed. And, as discussed above, were the user to scroll up and through all of the information elements in the "Talk" information panel 206, the operating system could automatically collapse the "Talk" information panel 206 and expand the "Gmail" information panel 205. Once expanded, the "Gmail" information panel 205 could reveal a list of email messages the user has recently sent or received.

Figure 2C:
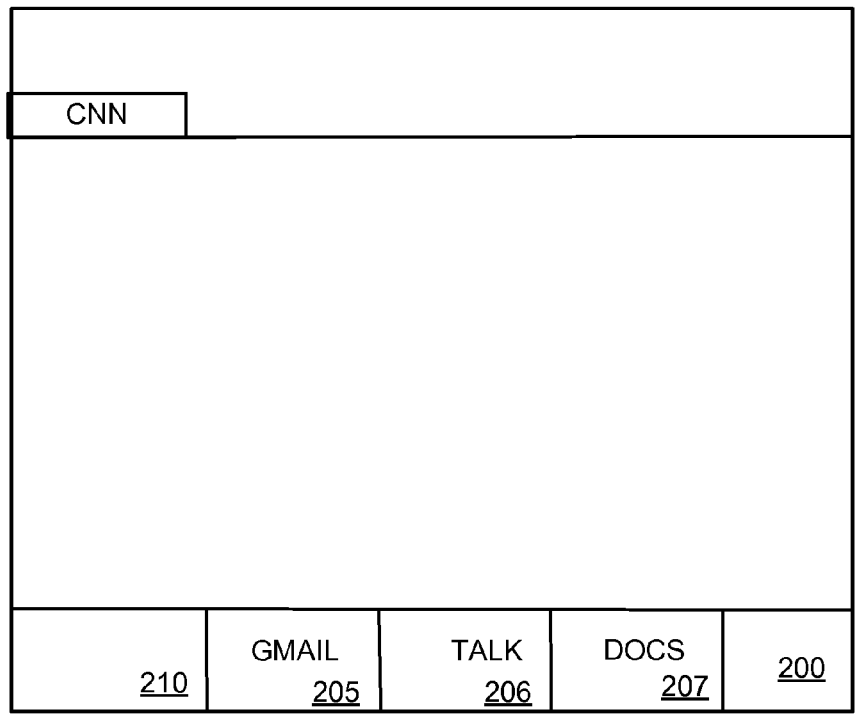
FIGS. 2C and 2D are a schematic illustration of a computer user interface that contains a plurality of expandable and collapsible information panels horizontally displayed in a panel bar.
Figure 2D:
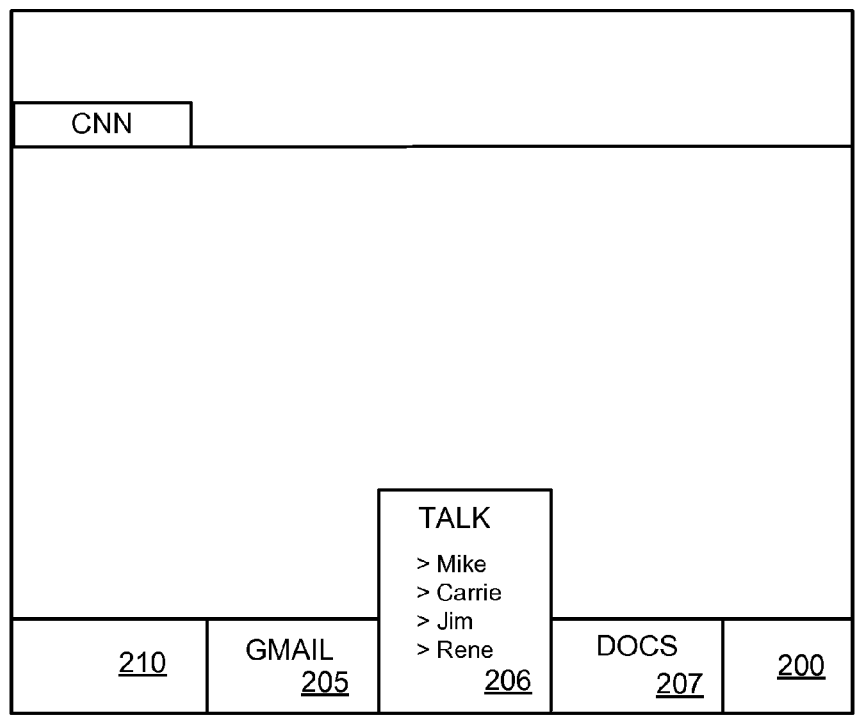

In another implementation, as shown in FIGS. 2C and 2D, the Google Gmail 205, Google Talk 206 and Google Docs 207 applications can be horizontally displayed as a series of information panels in a horizontal panel bar 210 of desktop user interface 200. The horizontal panel bar 210 can be displayed at the bottom edge of user interface 200 as shown in the figures, or along the top edge of user interface 200 (not shown). The Gmail 205, Talk 206 and Docs 207 information panels can be automatically expanded and collapsed when displayed in horizontal panel bar 210 in the same manner as described above when they are displayed in a vertical panel bar 210. As the user moves through the user interface, the operating system can use information about the current position and movement of a horizontal scroll bar or cursor representing a pointing device to automatically expand and collapse the horizontally displayed Gmail 205, Talk 206 and Docs 207 information panels in the horizontal panel bar 210. For example, the operating system can expand an information panel when a user selects it or when the user scrolls past its title. Similarly, the operating system can automatically collapse an expanded information panel in the horizontal panel bar 210 when the user has scrolled past the title of the information panel.

As shown in FIG. 2D, when the operating system automatically expands an information panel, such as the "Talk" information panel 206, the individual information elements that are contained within that information panel are revealed. For example, when a user scrolls past the "Talk" information panel 206, the operating system can automatically expand the "Talk" information panel 206 to reveal a number of recent chats the user has had with other users. Of course, when different information panels are expanded, different information elements can be revealed. And, were the user to scroll past the "Talk" information panel 206, the operating system could automatically collapse the "Talk" information panel 206 and automatically expand the "DOCS" information panel 207. Once expanded, the "DOCS" information panel 207 could reveal a list of documents the user has recently opened, saved, created, edited, copied, renamed or viewed.

Figure 3:
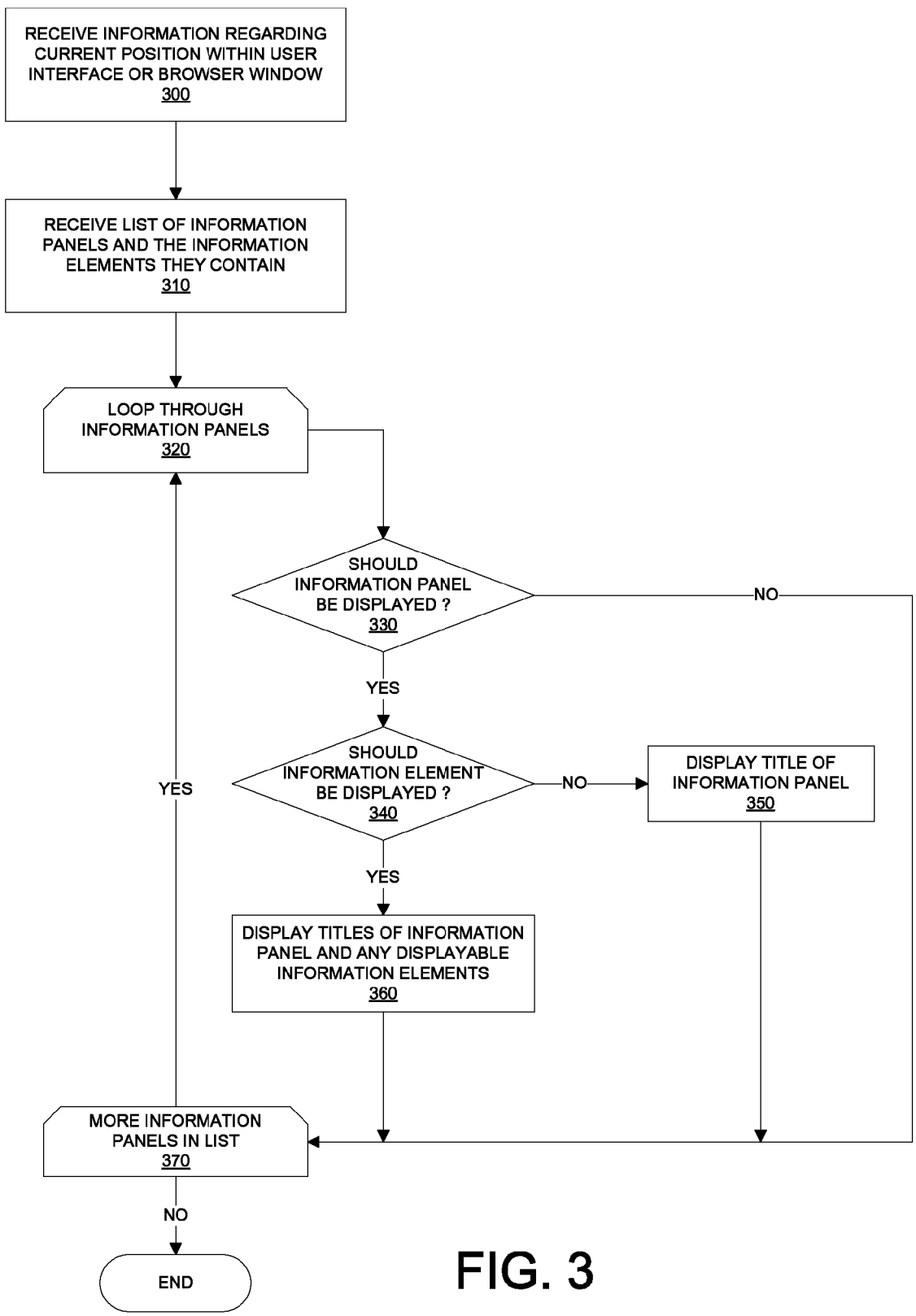
FIG. 3 is a flow chart disclosing a method for automatically expanding, collapsing and displaying information panels and information elements in a user interface.

FIG. 3 is a flow chart disclosing a method for automatically expanding, contracting and displaying information panels and the information elements they contain in a user interface. As shown in FIG. 3, an operating system and/or browser can receive information regarding a user's current position within a user interface (300). The user interface can be displayed on a computer display or within a browser window displayed on the computer display. The user's current position within the user interface can be determined, e.g., from the position of a cursor representing a pointing device (e.g., a mouse, trackball or touch screen element) or from the current position of a scroll bar within the user interface. The operating system and/or browser can also receive a list of information panels to be displayed in the user interface, and the information elements contained within those information panels (310). The information panels can be docked in a Panel Bar 210 of a desktop user interface on a computer 200 as shown in FIG. 2, or can displayed within a browser window 100 as shown in FIG. 1. The Panel Bar 210 can be displayed along a vertical edge (e.g., left or right) of the user interface as shown in FIG. 2, or can be displayed along a horizontal edge (e.g., top or bottom) of the user interface.

The operating system and/or browser can loop through the received information panels (320), and can determine for each information panel whether the information panel is currently displayable and/or should currently be displayed within the user interface (330). To make this determination, the operating system can use information about the current size of the user interface or browser window and information about the user's current position within the user interface or browser window. The user's current position within the user interface or browser window can be determined from the position of a cursor or from the current position of a scroll bar within the user interface. If the information panel is not currently displayable within the user interface (330), the operating system and/or browser can select the next information panel in the list if one exists (370), otherwise the process terminates.

However, if the information panel is currently displayable within the user interface (330), the operating system and/or browser can determine if any of the information elements within the information panel is currently displayable and/or should currently be displayed within the user interface (340). As before, the operating system and/or browser can use information about the current size of the user interface or browser window and information about the user's current position within the user interface or browser window to make this determination. For example, as discussed above, the operating system and/or browser can determine that an information element within an information panel is currently displayable and should be displayed whenever the information about the current size of the user interface or browser window and the user's current position within the user interface or browser window indicates that the user has selected (e.g., clicked on) the information panel, has scrolled past the title of the information panel, or that the information elements within the information panel have become displayable.

If the operating system and/or browser determines that no information elements are currently displayable in the user interface, the operating system and/or browser can display the title of the information panel in the user interface (350). By displaying only the title of the information panel, the panel will appear to be in its collapsed state within the user interface. However, if the operating system and/or browser determines that at least one information element within the information panel is currently displayable in the user interface (340), the operating system and/or browser can display the title of the information panel and the title of the at least one currently displayable information element within the information panel in the user interface (360). The title of the at least one currently displayable information element can be displayed beneath the title of the information panel in the user interface. By displaying both the title of the information panel and the title of the at least one information element within the information panel, the information panel will appear to be in its expanded state within the user interface. After displaying either the title of the information panel (350) or the title of the information panel and the titles of all currently displayable information elements within the information panel (360), the operating system and/or browser can select the next information panel in the list of information panels if one exists (370), otherwise the process terminates.

Figure 4:
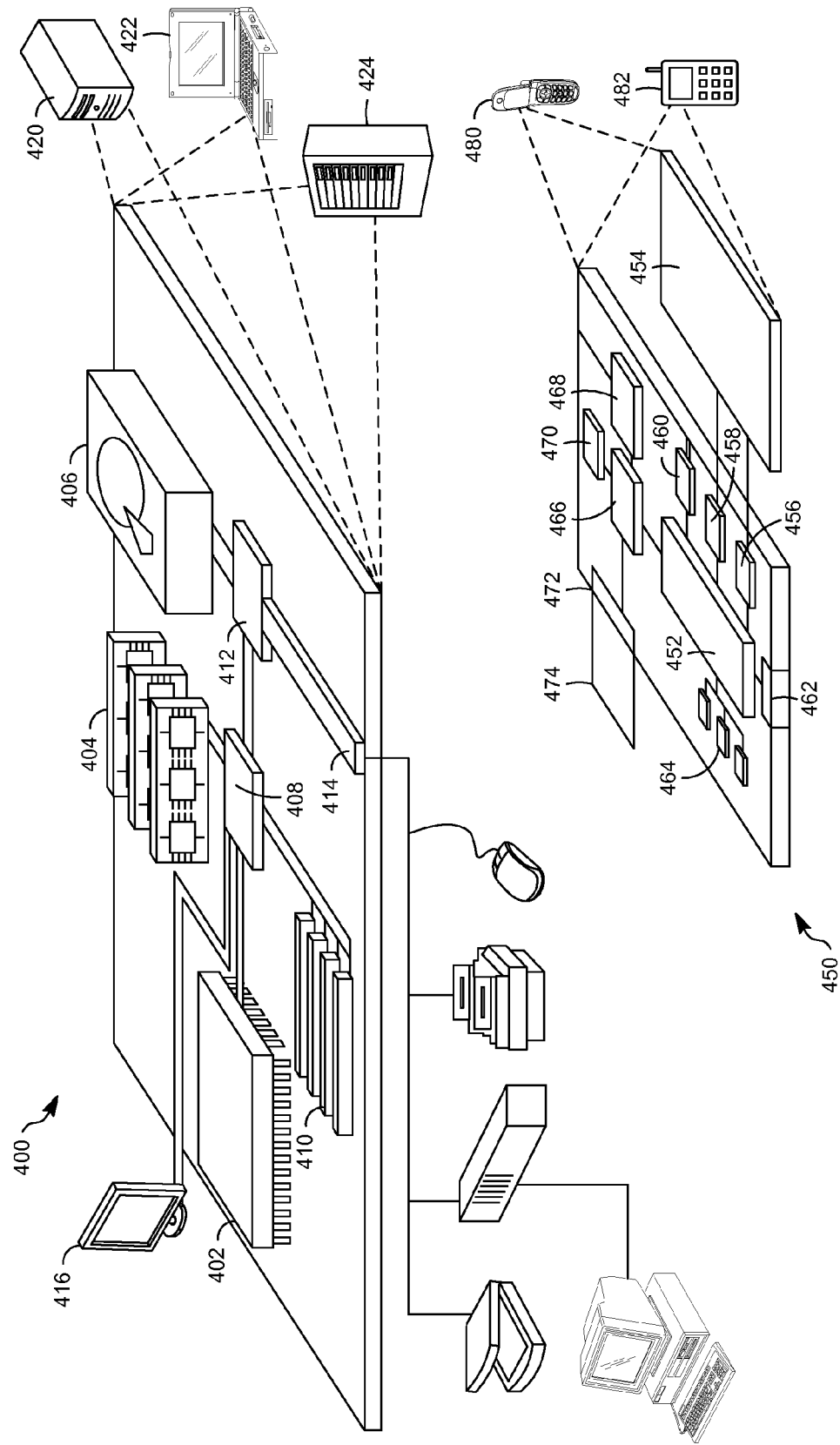
FIG. 4 is a schematic illustration of a computer device and a mobile computer device that can be used to implement the techniques described herein.

FIG. 4 is a schematic illustration of a generic computer device 400 and a generic mobile computer device 450 that may be used with the techniques described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described above. Nevertheless, it will be understood that various modifications may be made without departing from the spirit and scope of the invention. For example, the logic flows depicted in the figures do not necessarily require the particular order shown, or sequential order, to achieve desirable results. In addition, other steps may be provided or eliminated from the described flows, and other components may be added to or removed from the described systems, without departing from the scope of the invention. Accordingly, other implementations are within the scope of the following claims.

What is claimed is:

1. A computer implemented method for displaying information content in a user interface, comprising:

receiving, at a processor, content to be displayed in a window of the user interface, the content including a first information panel and a second information panel, the first information panel including a graphical-user-interface (GUI) configured to display at least one information element corresponding to a first application; and the second information panel including a GUI configured to display at least one information element corresponding to a second application;

displaying, at a first display position in the user interface, the first information panel in a collapsed state;

displaying, at a second display position in the user interface, the second information panel in an expanded state;

receiving, at the processor, information representing a first user indicated position representing a change in a focus position within the user interface in response to user input to scroll the user interface, the first user indicated position corresponding to the first information panel, the information representing the first user indicated position including information representing a position of a scroll bar within the user interface;

in response to receiving the information representing the first user indicated position and a determination from the position of the scroll bar that the first information panel becomes displayable, displaying the first information panel in an expanded state, including displaying, within the first information panel, the at least one information element corresponding to the first application; and in response to receiving the information representing the first user indicated position displaying the second information panel in a collapsed state.

2. The computer implemented method of claim 1, wherein the information representing the first user indicated position includes information representing a position of a pointing device within the user interface.

3. The computer implemented method of claim 1, further comprising:

receiving, at the processor, information representing a second user indicated position within the user interface, the second user indicated position corresponding to the second information panel; and in response to receiving the information representing the second user indicated position: displaying the first information panel in the collapsed state; and displaying the second information panel in the expanded state including displaying the at least one information element corresponding to the second application within the second information panel.

4. The computer implemented method of claim 1, further comprising, as a result of displaying the first information panel in the expanded state, displaying the second information panel in the collapsed state at a third display position in the user interface instead of displaying the second information panel in the collapsed state at the second display position.

5. The computer implemented method of claim 1, wherein:

the at least one information element corresponding to the first application includes a plurality of information elements; and displaying the at least one information element corresponding to the first application includes displaying only a portion of the plurality of information elements within the first information panel.

6. A computer implemented method for expanding an information panel in a user interface, comprising:

displaying a first information panel in a collapsed state at a first display position within the user interface, the first information panel including:

a graphical user interface (GUI) corresponding to a first application;

at least one information element corresponding to information accessible via the first application that is not displayed when the first information panel is displayed in the collapsed state;

displaying a second information panel in the collapsed state at a second display position within the user interface, the second information panel including:

a graphical user interface (GUI) corresponding to a second application;

at least one information element corresponding to information accessible via the second application that is not displayed when the second information panel is displayed in the collapsed state;

receiving, at a processor, information representing a first user indicated position within the user interface in response to user input to scroll the user interface, the first user indicated position corresponding to the second information panel, the information representing the first user indicated position including information representing a position of a scroll bar within the user interface; and in response to receiving the information representing the first user indicated position and a determination from the position of the scroll bar that the second information panel becomes displayable, displaying the second information panel in an expanded state in the user interface, including displaying, within the second information panel, the at least one information element corresponding to the second application; and receiving, at the processor, information representing a second user indicated position within the user interface in response to user input to scroll the user interface, the second user indicated position corresponding to the first information panel, the information representing the user indicated position including information representing a position of a scroll bar within the user interface; and in response to receiving the information representing the second user indicated position and a determination from the position of the scroll bar that the first information panel becomes displayable, displaying the second information panel in the collapsed state in the user interface, and displaying the first information panel in the expanded state in the user interface, including displaying, within the first information panel, the at least one information element corresponding to the first application.

7. The computer implemented method of claim 6, wherein the information representing the user indicated position includes information representing a position of a pointing device within the user interface.

8. The computer implemented method of claim 6, further comprising:

receiving, at the processor, information representing a second user indicated position within the user interface, the second user indicated position corresponding the first information panel; and in response to receiving the information representing the second user indicated position:

displaying the second information panel in the collapsed state; and displaying the first information panel in the expanded state, including displaying the at least one information element corresponding to the first application within the first information panel.

9. A computer implemented method for collapsing an information panel in a user interface, comprising:

displaying a first information panel in an expanded state at a first position within the user interface, the first information panel including:

a graphical user interface (GUI) corresponding to a first application;

at least one information element corresponding to the first application that is displayed in the user interface within the first information panel when the first information panel is displayed in the expanded state;

displaying a second information panel in a collapsed state at a second display position within the user interface, the second information panel including:

a graphical user interface (GUI) corresponding to a second application;

at least one information element corresponding to the second application that is not displayed when the second information panel is displayed in the collapsed state;

receiving, at a processor, information representing a user indicated position representing a change in a focus position within the user interface in response to user input to scroll the user interface, the user indicated position corresponding to the second information panel, the information representing the user indicated position including information representing a position of a scroll bar within the user interface; and in response to receiving the information representing the user indicated position and a determination from the position of the scroll bar that the first information panel becomes displayable:

displaying the first information panel in the collapsed state in the user interface, including no longer displaying the at least one information element corresponding to the first application; and displaying the second information panel in the expanded state in the user interface, including displaying, within the second information panel, the at least one information element corresponding to the second application.

10. The computer implemented method of claim 9, wherein the information representing the user indicated position includes information representing a position of a pointing device within the user interface.

11. A computer program product for displaying information content in a user interface, tangibly embodied on a non-transitory machine readable medium, comprising instructions operable to cause a programmable processor to:

receive content to be displayed in a window of the user interface, the content including a first information panel and a second information panel, the first information panel including a graphical-user-interface (GUI) configured to display at least one information element corresponding to information accessible via a first application; and the second information panel including a GUI configured to display at least one information element corresponding to information accessible via a second application;

display, at a first display position in the user interface, the first information panel in a collapsed state;

display, at a second display position in the user interface, the second information panel in the collapsed state;

receive information representing a first user indicated position within the user interface in response to user input to scroll the user interface, the first user indicated position corresponding to the first information panel, the information representing the first user indicated position including information representing a position of a scroll bar within the user interface; and in response to receiving the information representing the first user indicated position and a determination from the position of the scroll bar that the second information panel becomes displayable, display the first information panel in an expanded state, including displaying, within the first information panel, the at least one information element corresponding to the first application; and receiving, at the processor, information representing a second user indicated position within the user interface in response to user input to scroll the user interface, the second user indicated position corresponding to the second information panel, the information representing the user indicated position including information representing a position of the scroll bar within the user interface; and in response to receiving the information representing the second user indicated position and a determination from the position of the scroll bar that the second information panel becomes displayable, displaying the first information panel in the collapsed state in the user interface, and displaying the second information panel in the expanded state in the user interface, including displaying, within the second information panel, the at least one information element corresponding to the second application.

12. The computer program product of claim 11, wherein the information representing the user indicated position includes information representing a position of a pointing device within the user interface.

13. A computer program product for expanding an information panel in a user interface, tangibly embodied on a non-transitory machine readable medium, comprising instructions operable to cause a programmable processor to:

display a first information panel in a collapsed state at a first display position within the user interface, the first information panel including:

a graphical user interface (GUI) corresponding to a first application;

at least one information element corresponding to information accessible via the first application that is not displayed when the information panel is displayed in the collapsed state;

display a second information panel in the collapsed state at a second display position within the user interface, the second information panel including:

a graphical user interface (GUI) corresponding to a second application;

at least one information element corresponding to information accessible via the second application that is not displayed when the second information panel is displayed in the collapsed state;

receive information representing a first user indicated position within the user interface in response to user input to scroll the user interface, the first user indicated position corresponding to the second information panel, the information representing the first user indicated position including information representing a position of a scroll bar within the user interface; and in response to receiving the information representing the first user indicated position and a determination from the position of the scroll bar that the second information panel becomes displayable, display the second information panel in an expanded state in the user interface, including displaying, within the second information panel, the at least one information element corresponding to the second application; and receiving, at the processor, information representing a second user indicated position within the user interface in response to user input to scroll the user interface, the second user indicated position corresponding to the first information panel, the information representing the user indicated position including information representing a position of a scroll bar within the user interface; and in response to receiving the information representing the second user indicated position and a determination from the position of the scroll bar that the first information panel becomes displayable, displaying the second information panel in the collapsed state in the user interface, and displaying the first information panel in the expanded state in the user interface, including displaying, within the first information panel, the at least one information element corresponding to the first application.

14. The computer program product of claim 13, wherein the information representing the first user indicated position includes information representing a position of a pointing device within the user interface.

15. A computer program product for collapsing an information panel in a user interface, tangibly embodied on a non-transitory machine readable medium, comprising instructions operable to cause a programmable processor to:

display a first information panel in an expanded state at a first position within the user interface, wherein the first information panel including:

a graphical user interface (GUI) corresponding to a first application; at least one information element corresponding to the first application that is displayed in the user interface within the first information panel when the first information panel is displayed in the expanded state;

display a second information panel in a collapsed state at a second display position within the user interface, the second information panel including:

a graphical user interface (GUI) corresponding to a second application;

at least one information element corresponding to the second application that is not displayed when the second information panel is displayed in the collapsed state;

receive information representing a user indicated position representing a change in a focus position within the user interface in response to user input to scroll the user interface, the user indicated position corresponding to the second information panel, the information representing the user indicated position including information representing a position of a scroll bar within the user interface; and in response to receiving the information representing the user indicated position and a determination from the position of the scroll bar that the first information panel becomes displayable:

display the first information panel in the collapsed state in the user interface, including no longer displaying the at least one information element corresponding to the first application: and display the second information panel in the expanded state in the user interface, including displaying, within the second information panel, the at least one information element corresponding to the second application.

16. The computer program product of claim 15, wherein the information representing the user indicated position includes information representing a position of a pointing device within the user interface.

\* \* \* \* \*